United States Patent
Marczewski

(10) Patent No.: US 8,266,489 B2
(45) Date of Patent: Sep. 11, 2012

(54) RECOVERING FROM A LINK DOWN EVENT OF A TWO-WAY SERIAL CONNECTION

(75) Inventor: Jaroslaw Grzegorz Marczewski, Mississauga (CA)

(73) Assignee: ATI Technologies ULC, Ontario (CA)

( * ) Notice: Subject to any disclaimer, the term of this patent is extended or adjusted under 35 U.S.C. 154(b) by 1303 days.

(21) Appl. No.: 11/875,559

(22) Filed: Oct. 19, 2007

(65) Prior Publication Data

US 2009/0103543 A1    Apr. 23, 2009

(51) Int. Cl.
   *H04L 1/18* (2006.01)
(52) U.S. Cl. ............................... 714/749
(58) Field of Classification Search ............ 714/749
   See application file for complete search history.

(56) References Cited

U.S. PATENT DOCUMENTS

| | | | | |
|---|---|---|---|---|
| 4,439,859 A | * | 3/1984 | Donnan | 714/748 |
| 5,537,580 A | * | 7/1996 | Giomi et al. | 716/55 |
| 7,061,858 B1 | * | 6/2006 | Di Benedetto et al. | 370/219 |
| 7,191,255 B2 | * | 3/2007 | Wong et al. | 710/5 |
| 7,561,593 B1 | * | 7/2009 | Wilkie | 370/450 |
| 7,957,267 B2 | * | 6/2011 | Sasagawa et al. | 370/216 |
| 2009/0046579 A1 | * | 2/2009 | Lu et al. | 370/225 |

OTHER PUBLICATIONS

PCI Express—An Overview of the PCI Express Standard, National Instruments, Feb. 1, 2006, pp. 1-11, http://zone.ni.com/devzone/cda/tut/p/id/3767 retrieved Jul. 26, 2007.
Jon Stokes, PCI Express: An Overview, ARS Technica, Jul. 7, 2004, p. 1 (pp. 1-4), p. 2 (1-3), p. 3 (1-4), p. 4 (pp. 1-3), p. 5 (pp. 1-4), p. 6 (pp. 1-3), and p. 7 (pp. 1-3), http://arstechnica.com/articles/paedia/hardware/pcie.ars retrieved Aug. 1, 2007.

* cited by examiner

*Primary Examiner* — Ajay Bhatia
*Assistant Examiner* — Daniel McMahon
(74) *Attorney, Agent, or Firm* — Sterne, Kessler, Goldstein & Fox PLLC

(57) ABSTRACT

A method for surviving a link down event in a two-way serial-connection link. The method includes sequentially numbering packets to be transmitted across the link, successfully transmitted packets being acknowledged and after the link down event. Only packets unacknowledged are retransmitted when a device coupled to the link attempts to survive the event, each unacknowledged packet being retransmitted in accordance with its number within the sequence.

10 Claims, 6 Drawing Sheets

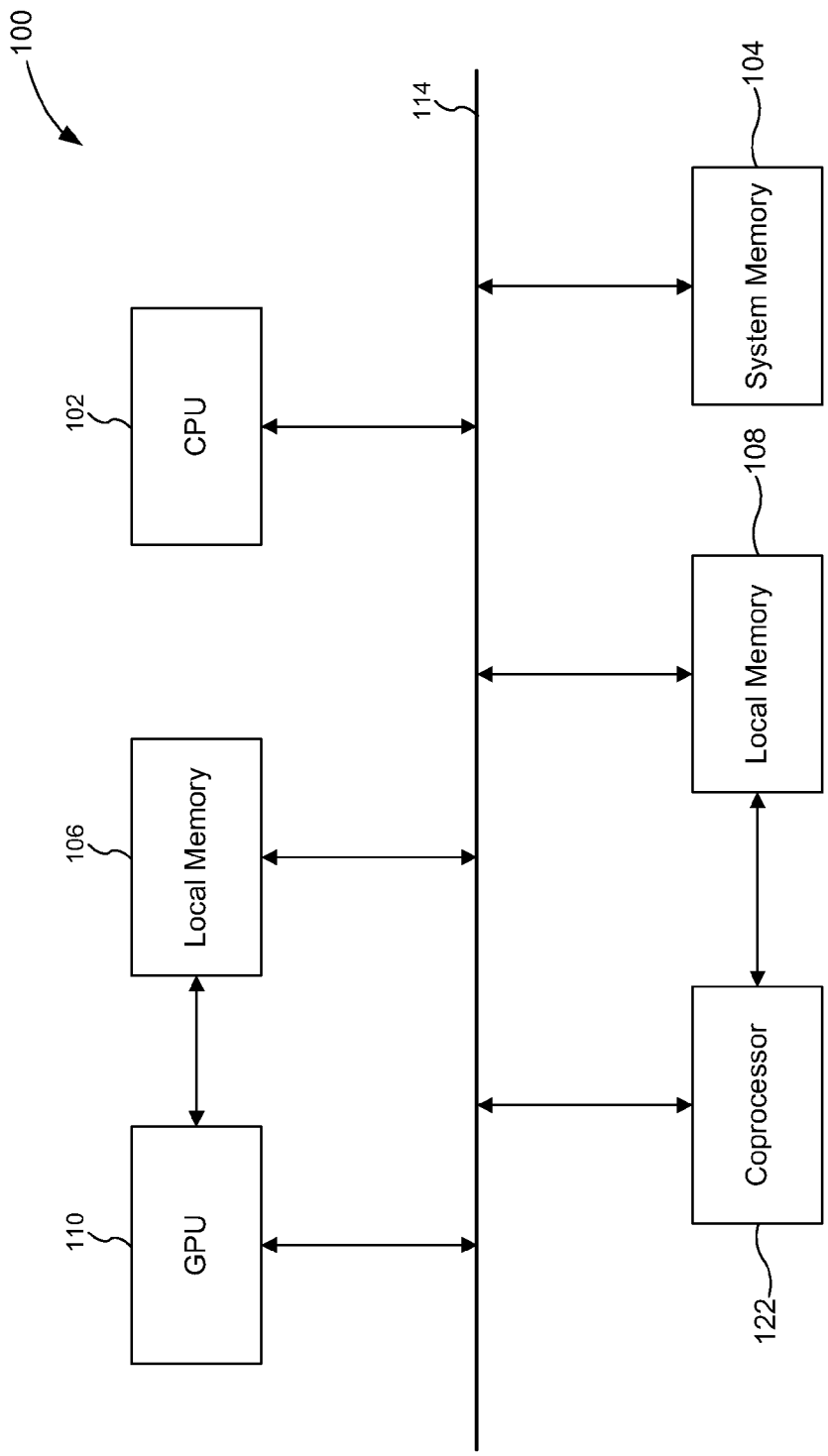
FIG. 1
(CONVENTIONAL)

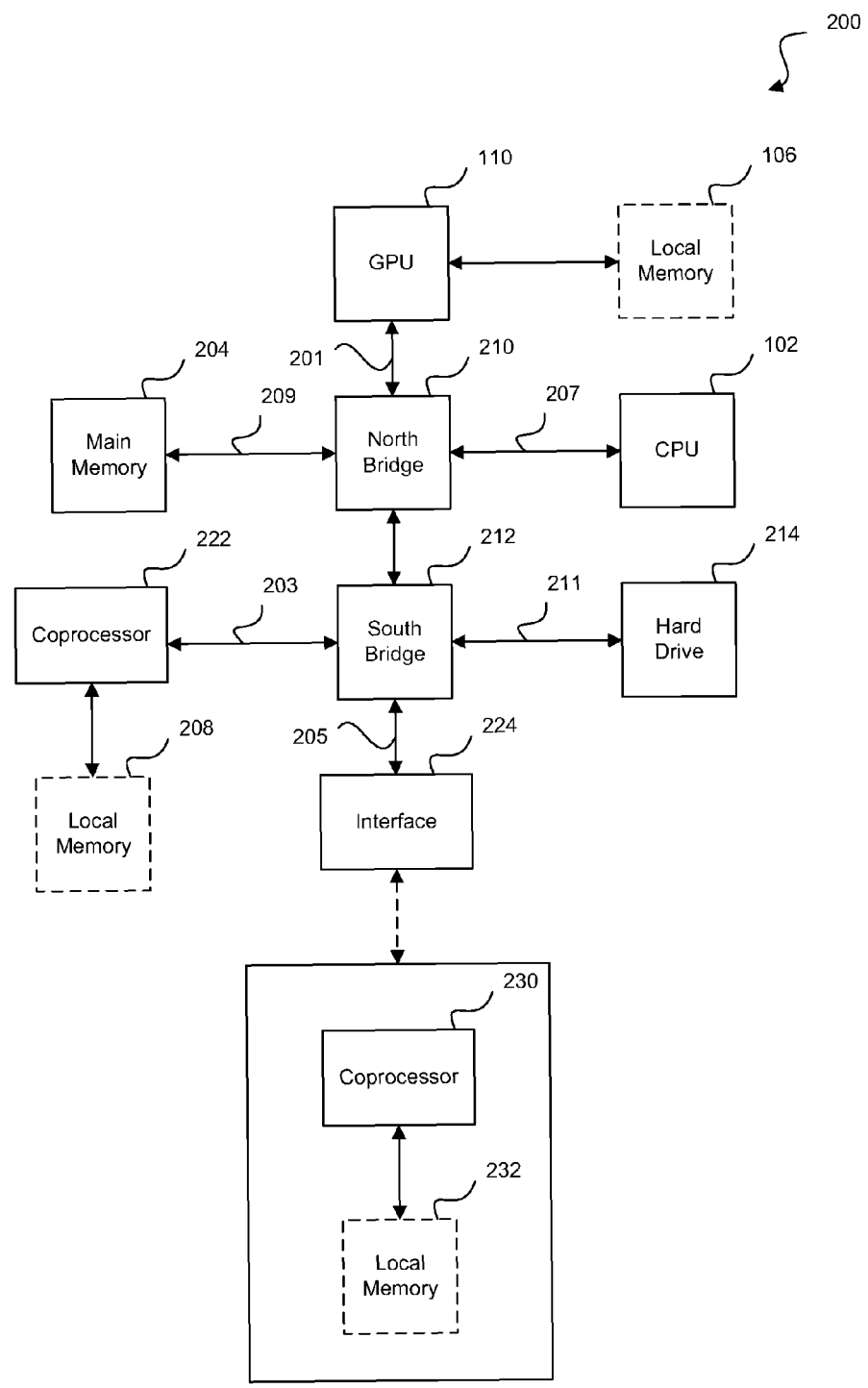
FIG. 2
(CONVENTIONAL)

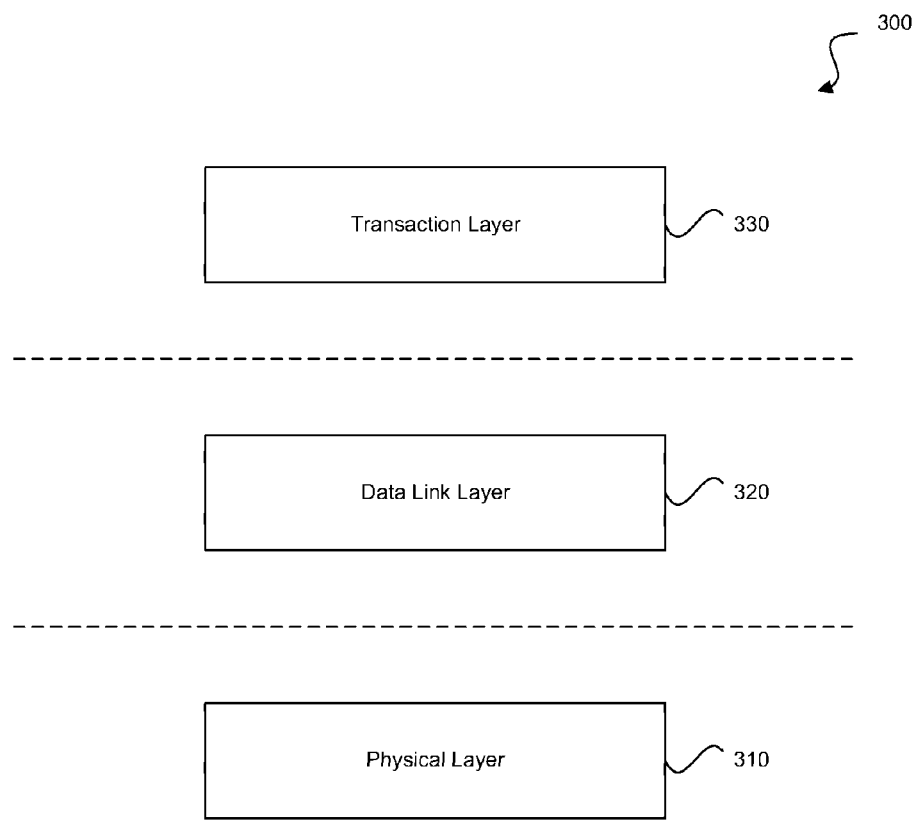
FIG. 3
(CONVENTIONAL)

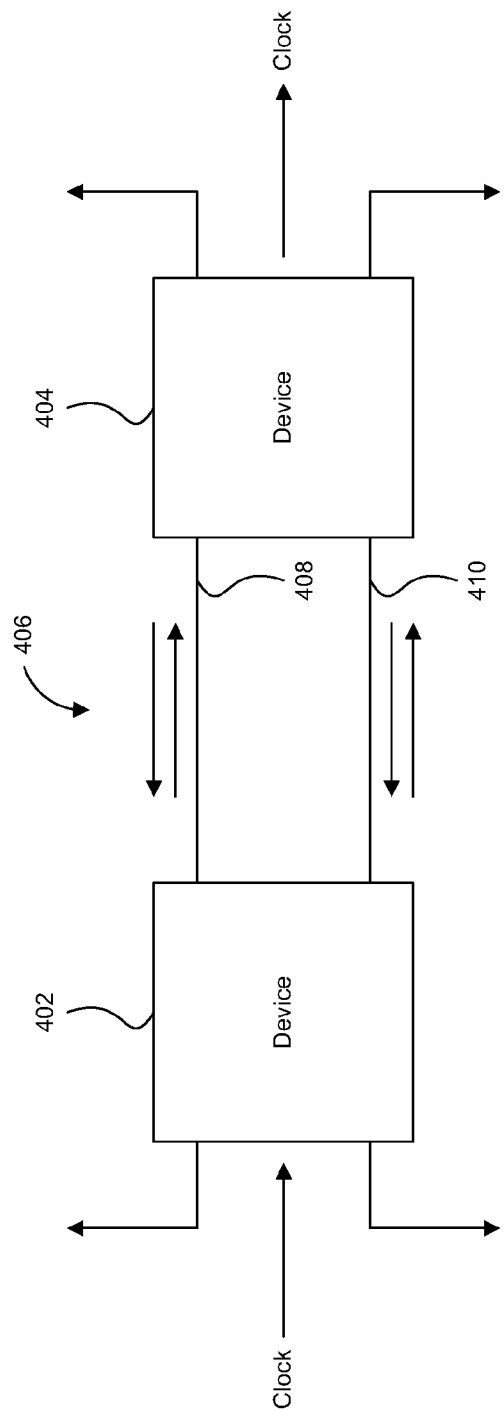
FIG. 4
(CONVENTIONAL)

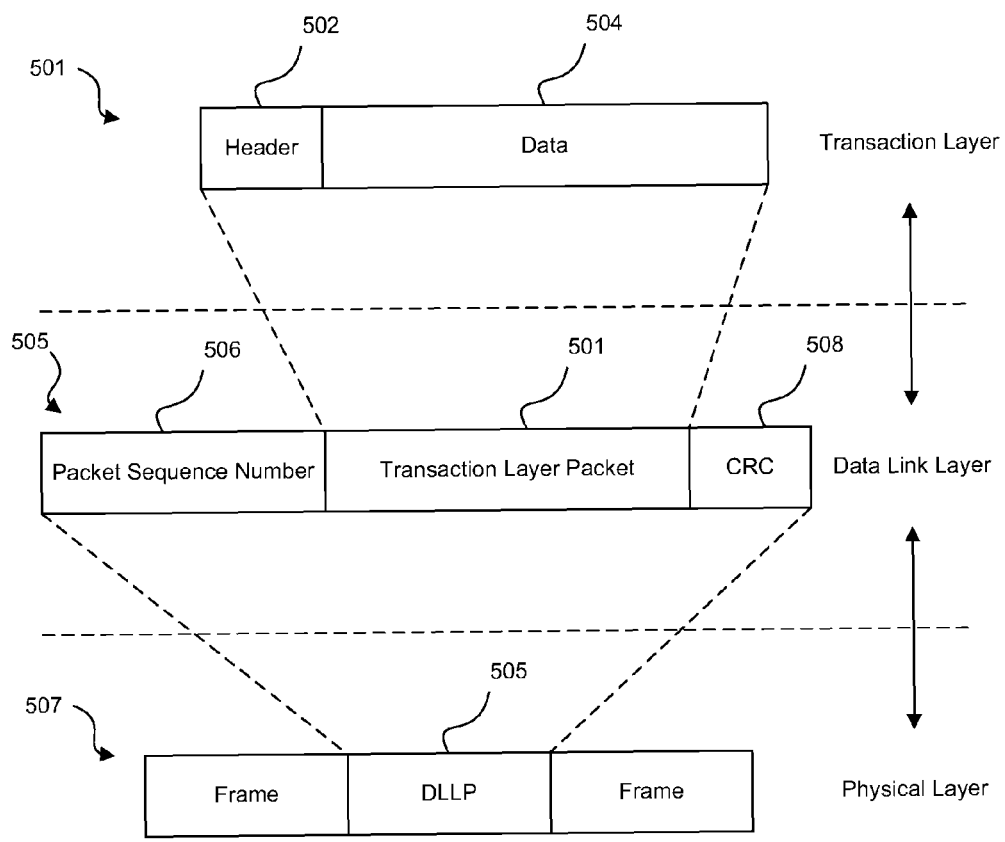
FIG. 5
(CONVENTIONAL)

RECOVERING FROM A LINK DOWN EVENT OF A TWO-WAY SERIAL CONNECTION

BACKGROUND OF THE INVENTION

1. Field of the Invention

The present invention is generally directed to computing systems, and more particularly directed to connections between components of computing systems.

2. Background Art

A modern computing system includes a plurality of hardware components, such as a central processing unit (CPU) and a graphics processing unit (GPU). The CPU is a general-purpose computing device that coordinates the operations of all the other devices of the computing system. The GPU is a special-purpose computing device that typically performs computing tasks associated with creating and processing images for display. A modern computing system may include a plurality of other types of devices, such as a main memory, a hard disk, a TV tuner, a sound card, and the like.

The various devices of a computing system communicate with the CPU (and each other) over a bus. The bus provides an electrical pathway between the various devices. The electrical pathway may be implemented in a shared topology or a point-to-point topology.

In a shared topology, all the devices are connected to the CPU over a single bus. Each computational component (e.g., CPU, GPU, sound card, etc.) includes some kind of bus arbitration scheme to determine which computational component gets access to the bus at a particular time. A typical bus arbitration scheme is based on the address space allocated to each device. According to this scheme, each data packet broadcast on the bus is associated with an address. If a computational component "hears" an address broadcast on the bus that corresponds to its address space, then that computational component accesses the bus to read the associated data packet. A problem with this scheme, however, is that the individual bus arbitration schemes may not function properly as the traffic on the bus increases.

In a point-to-point topology, the devices are connected by a shared switch. Unlike the shared topology, computational components connected in a point-to-point topology do not need to implement any type of bus arbitration scheme. Rather, the shared switch breaks the continuous stream of data on the bus into data packets that are routed to the individual devices. In this way, the shared switch establishes point-to-point connections ("links") between the various devices. From an individual device's perspective, a link appears to be a private, direct, continuous connection to another device. The link may comprise one or more two-way serial-connections ("lanes"). Increasing the number of lanes of a link, increases the bandwidth of the link. An example point-to-point bus topology is implemented in peripheral component interface express ("PCI Express").

A point-to-point bus topology may be implemented with one or more shared switches. One popular design includes two switches, referred to as the north bridge and the south bridge. The north bridge and the south bridge are coupled together by one or more links. The north bridge acts as a shared switch for the CPU, the GPU, and the main memory. The south bridge acts as a shared switch for other devices.

The point-to-point bus topology provides advantages over the shared bus topology. For example, the shared switch can prioritize time critical streaming data, such as a video stream or an audio stream. This results in fewer dropped video frames and lower audio latencies.

A problem with the point-to-point bus topology occurs, however, when the link between two devices becomes impaired or destroyed by a link down event. Different types of events may lead to a link down—such as electrical noise, a change in speed over the link, or a change in the number of lanes that comprise the link. There are no conventional mechanisms for surviving a link down event. Conventionally, a link down event is a fatal error.

To recover from a link down event, a conventional computing system must clear all traffic on the link and then restart the link. As a first example, if a link down event occurs in the link between a conventional CPU and a conventional GPU, all traffic on that link must be cleared and any application utilizing the conventional GPU must be restarted. Consequently, if a user is watching video from a streaming video application when the link down event occurs, for example, the user would have to restart the streaming video application to recover from the link down event in a conventional manner. As a second example, if a link down event occurs in a link between the north bridge and the south bridge of a conventional computing system, a system hang results. To recover from such a system hang, a user of the conventional computing system would have to reboot the conventional computing system. Thus, in conventional computing systems, a link down event results in loss of data transmitted over the link, and any application or computing system utilizing the link must be restarted.

Given the foregoing, what is needed are improved systems and methods for recovering from a link down event.

BRIEF SUMMARY OF THE INVENTION

The present invention is directed to recovering from a link down event. For example, embodiments of the present invention are directed to methods and systems for recovering from a link down event that occurs in a two-way serial-connection link (such as a PCI Express link). Such methods and systems enable an application or computing system to survive the link down event without requiring the application or computing system to restart.

In accordance with an embodiment of the present invention there is provided a method for surviving a link down event of a two-way serial-connection link. According to this method, when a link down event occurs, a sequence numbering of the link is maintained before and after the link down event. In this way, packets that were transmitted are not lost. After the link comes back up, any packets that were "in flight" (i.e., packets that were transmitted but not acknowledged) are retransmitted (e.g., replayed) in accordance with the sequence numbering.

In accordance with another embodiment of the present invention there is provided a system for surviving a link down event. This system includes a first device coupled to a second device via a two-way serial-connection link. When a link down event occurs, the first device is adapted to maintain a sequence numbering of the link, and retransmit (e.g., replay) one or more "in-flight" packets in accordance with the sequence numbering.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 1 depicts a block diagram illustrating an example computer system.

FIG. 2 depicts a block diagram illustrating an example point-to-point bus topology of a computer system.

FIG. 3 depicts a block diagram illustrating example layers implemented by a PCI Express device.

FIG. 4 depicts a block diagram illustrating example packets corresponding to the layers depicted in FIG. 3.

FIG. 5 depicts a block diagram illustrating an example physical layer link between a first and second device.

Figure 6:
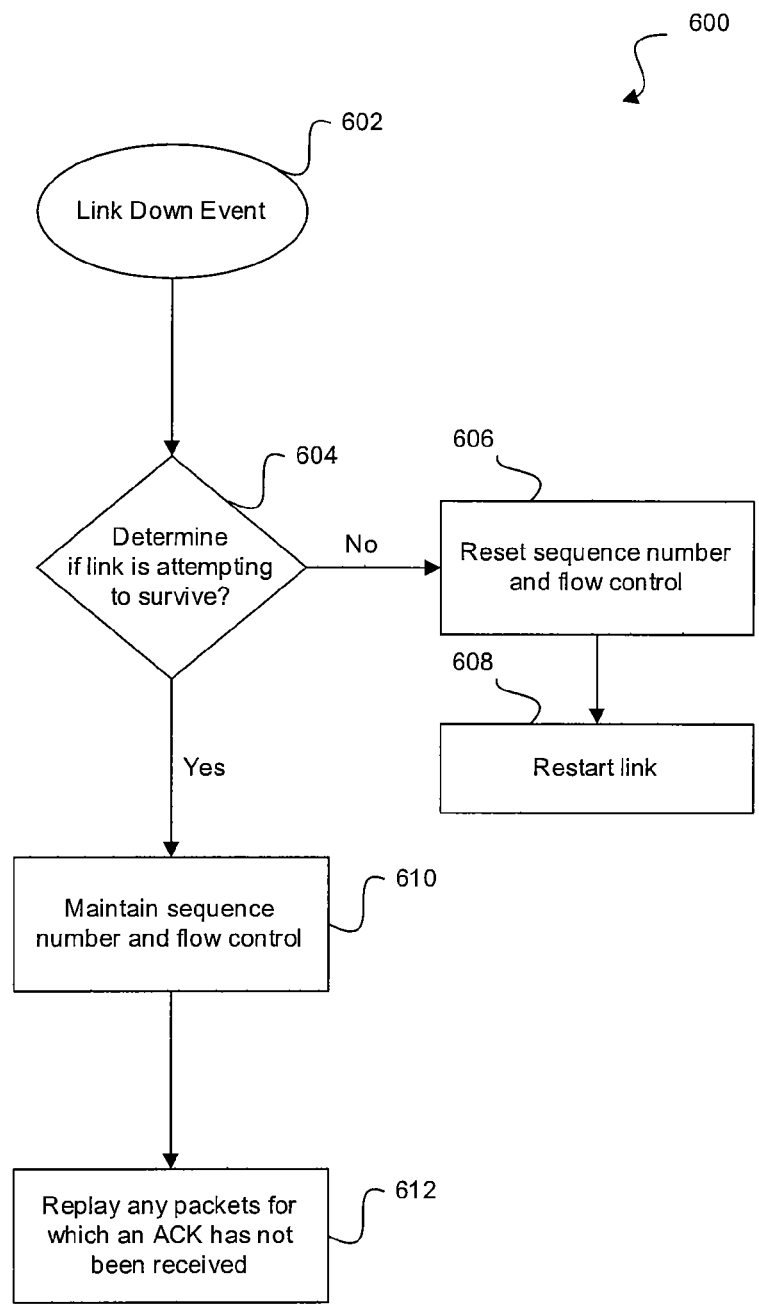
FIG. 6 depicts a block diagram illustrating an example method for recovering from a link down event in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present invention is directed to recovering from (e.g., surviving) a link down event that may occur in a two-way serial-connection link—such as, a PCI Express link. In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In accordance with an embodiment of the present invention, a first device of a computing system (such as a GPU) is configured to recover from a link down event. The first device communicates with a second device (such as a CPU) over a bus. The bus provides a two-way serial-connection link between the first and second devices. During normal communication, the first device maintains a sequence numbering and flow control information to ensure proper transmission of data packets over the bus. Upon proper receipt of a data packet, the second device transmits an acknowledgement packet. When a link down event occurs, the first device is configured to maintain the sequence numbering and flow control information. Any "in-flight" packets (i.e., packets for which acknowledgements have not been received) are retransmitted in accordance with the sequence numbering and flow control. Thus, unlike conventional devices, the first device can survive the link down event without losing transmitted packets, and without requiring an application and/or the computing system to restart.

For illustrative purposes, and not limitation, the present invention will be described herein in terms of a PCI Express link between the first and second device. PCI Express is described, for example, in PCI Express Base Specification Revision 1.0, Apr. 29, 2002, the entirety of which is incorporated by reference herein. A person skill in the relevant art(s) will appreciate, however, that the present invention may be implemented in devices that are coupled together by other types of two-way serial-connection links. These other types of two-way serial-connection links are contemplated within the spirit and scope of the present invention.

II. An Example System

FIG. 1 depicts a block diagram illustrating an example computing system 100 in accordance with an embodiment of the present invention. Computing system 100 includes a CPU 102, a GPU 110, and may optionally include a coprocessor 122. In addition, computing system 100 includes a system memory 104 that may be accessed by CPU 102, GPU 110, and coprocessor 122.

GPU 110 and coprocessor 122 assist CPU 102 by performing certain special functions, usually faster than CPU 102 could perform them in software. Coprocessor 122 may comprise, but is not limited to, a floating point coprocessor, a GPU, a networking coprocessor, and other types of coprocessors and processors as would be apparent to a person skilled in the relevant art(s).

Computing system 100 further includes local memory 106 and local memory 108. Local memories 106 and 108 are available to GPU 110 and coprocessor 122, respectively, in order to provide faster access to certain data (such as data that is frequently used) than would be possible if the data were stored in system memory 104. Local memories 106 and 108 may include, for example, a frame buffer, a texture buffer, a vertex buffer, an index buffer, and the like.

GPU 110 and coprocessor 122 communicate with CPU 102 and system memory 104 over a bus 114. In an embodiment, bus 114 comprises a two-way serial-connection link between any two devices of computing system 100 (such as GPU 110, coprocessor 122, CPU 102, or system memory 104). Such a two-way serial-connection link may be implemented as a PCI Express link, for example.

FIG. 2 depicts a block diagram illustrating an example system 200. As in FIG. 1, FIG. 2 illustrates system 200 including CPU 102, GPU 110, coprocessor 122, and (optionally) local memories 106 and 108. System memory 104 of FIG. 1 is illustrated in FIG. 2 as comprising a main memory 204 and a hard drive 214. Additionally, as depicted in FIG. 2, system 100 includes two switches—namely, north bridge 210 and south bridge 212—and an interface 224.

Generally speaking, north bridge 210 and south bridge 212 break the continuous stream of data on the bus into data packets that are routed to the respective devices. In this way, north abridge 210 and south bridge 212 establish point-to-point links between the respective devices.

More particularly, north bridge 210 is coupled to CPU 102, GPU 110, main memory 204, and south bridge 212. North bridge enables CPU 102 and GPU 110 to communicate with each other, and access main memory 204. In particular, north bridge 210 provides a direct connection between (i) CPU 102 and GPU 110, (ii) CPU 102 and main memory 204, and (iii) GPU 110 and main memory 204. In this way, CPU 102, GPU 110, and main memory 204 do not need to implement bus arbitration mechanisms to control who accesses the bus. North bridge also enables CPU 102, GPU 110, and main memory 204 to communicate with other devices coupled to south bridge 212.

South bridge 212 is coupled to coprocessor 122, hard drive 214, and interface 224. Similar to north bridge 210, south bridge 212 enables coprocessor 122 and hard drive 214 to communicate with each other and the devices coupled to north bridge 210. Additionally, interface 224 enables an additional coprocessor 230 (or more coprocessors) to be coupled to south bridge 212. Coprocessor 230 may be coupled to a local memory 232, and may be embodied on a card 240 (such as a PCMCIA CardBus module, an ExpressCard module, or the like). When coupled to interface 224, south bridge 212 enables coprocessor 230 to communicate with the devices connected to south bridge 212 and the devices connected to north bridge 210.

System 200 depicted in FIG. 2 is presented for illustrative purposes only, and not limitation. For example, the topology of system 200 depicted in FIG. 2 is presented for illustrative purposes only. As another example, the number and type of devices included in system 200 may be altered without deviating from the spirit and scope of the present invention. These and other alterations of system 200 are contemplated within the scope and spirit of the present invention.

In an embodiment, each device in FIG. 2 is adapted to operate in accordance with the PCI Express protocol. PCI Express is implemented as a layered protocol. FIG. 3 depicts a block diagram 300 illustrating example layers implemented by a PCI Express device in accordance with an embodiment of the present invention.

As illustrated in FIG. 3, PCI Express includes a transaction layer 330, a data link layer 320, and a physical layer 310. Transaction layer 330 includes header information and data that is to be delivered to devices coupled to the PCI Express link. Data link layer 320 provides for proper delivery of packets between devices coupled together via the PCI Express link. Physical layer 310 provides a physical connection between devices that are coupled together via the PCI Express link. Each of these packets is described in more detail below.

For example, FIG. 4 depicts a transaction layer packet 401, a data link layer packet 405, and a physical layer packet 407. Transaction layer packet 401 includes data 404 and a header 402. Data 404 comprises data that is to be communicated between devices coupled to the PCI Express link. Header 402 includes information used to direct data 404 to the intended device. For example, a first device coupled to the PCI Express link (such as GPU 110) may transmit data 404 intended for a second device coupled to the PCI Express link (such as CPU 102). In such an example, a shared switch (such as north bridge 210 and/or south bridge 212) establishes a link between the first device and the second device based on information in header 402. The shared switch may establish the link, for example, based on an address included in header 402. A person skilled in the relevant art(s) will appreciate, however, that header 402 may include other types of information to enable the shared switch to forward data 404 to the intended device.

Data link layer packet 405 implements a sequence numbering and a credit-based, flow control protocol to provide for proper receipt of transaction layer packet 401. Data link layer packet 405 includes a packet sequence number 406, transaction layer packet 401, and a cyclic redundancy check 408.

Packet sequence number 406 implements the sequence numbering by labeling each data link layer packet (such as data link layer packet 405) with a packet sequence number. For example, a first data link layer packet may have a sequence number of zero, a second data link layer packet may have a sequence number of one, and so on.

Cyclic redundancy check 408 implements the credit-based, flow control protocol. According to the credit-based, flow control protocol, a data link layer packet is transmitted based on the credit allocated to the transmitting device. In this way, a data link layer packet is only transmitted when a buffer is available to receive that packet. If a transmitted data link layer packet passes cyclic redundancy check 408, then the receiving device transmits a positive acknowledgement (ACK) to the transmitting device. In contrast, if the transmitted data link layer packet fails cyclic redundancy check 408, then the receiving device transmits a negative acknowledgement (NAK) to the transmitting device. If a NAK is received, the transmitting device places the data link layer packet corresponding to the NAK in a special buffer—referred to as a replay buffer—and the data link layer packet is subsequently replayed. In accordance with an embodiment of the present invention, the replay buffer is also used during recovery from a link down event, as described in more detail below.

Physical layer packet 407 sandwiches the data link layer packet 405 into a frame to be transported over the link. For example, FIG. 5 depicts a block diagram illustrating an example physical layer link 500 between a first device 502 and a second device 504. First device 502 and second device 504 may comprise any type of hardware component of a computing system that is coupled to other components by a two-way serial-connection link (such as, for example, any of the devices depicted in FIG. 2). Link 506 between first device 502 and second device 504 includes one or more lanes. As illustrated in FIG. 5, link 506 includes two lanes: a first lane 508 and a second lane 510. Each lane comprises a two-way serial-connection between first device 502 and second device 504. In an embodiment, the link between first device 502 and second device 504 may comprise 1, 2, 4, 8, 12, 16, 32, or some other number of lane(s).

III. Example Operation

During normal operation, first device 502 and second device 504 may transmit a plurality of data packets and acknowledgement packets over link 506. For example, Table 1 illustrates example communications between first device 502 and second device 504 over link 506. The first column of Table 1 illustrates packets transmitted by first device 502. The second column illustrates the sequence numbering (such as packet sequence number 406 of FIG. 4) of the transmitted packets. The third column illustrates the status of link 506. The fourth column indicates whether second device 504 received the transmitted packet or not. And, the fifth column indicates whether second device 504 has transmitted an acknowledgement or not.

TABLE 1

| Packet | Sequence Number | Link Status | Packet Status | Acknowledgement |
|---|---|---|---|---|
| 1st Packet | 0 | OK | Received | ACK |
| 2nd Packet | 1 | OK | Received | ACK |
| 3rd Packet | 2 | OK | Received | ACK |
| 4th Packet | 3 | Link Down | Not Received | — |
| 5th Packet | 4 | Link Down | Not Received | — |
| 6th Packet | 5 | Link Down | Not Received | — |

As illustrated in the example of Table 1, link 506 operates properly while the first three packets are transmitted by first device 502 to second device 504. These three packets are received by second device 504. Because these packets are properly received (e.g., they pass cyclic redundancy check 408), second device 504 transmits an ACK for each packet. Thereafter, however, a link down event impairs or destroys link 506. Thus, the fourth, fifth, and sixth packets transmitted by first device 502 are neither received nor acknowledged by second device 504.

An embodiment of the present invention enables first device 502 (and second device 504) to recover from the link down event without losing data packets that were transmitted by first device 502 (e.g., packets 1-6 from the example of Table 1), and without requiring an application or computing system utilizing first device 502 to restart. For example, FIG. 6 depicts a block diagram illustrating an example method for recovering from (e.g., surviving) a link down event.

Block diagram 600 begins when a link down event 602 occurs. Link down event 602 causes the data link layer to go into an inactive state (e.g., DL_INACTIVE). Link down event 602 may occur in link 506 between first device 502 and second device 504, and may be caused, for example, by noise, a change in the number of lanes comprising link 506, a change in the speed over link 506, or some other reason as would be apparent to a person skilled in the relevant art(s). In the example of Table 1, the link down event occurs some time after the third packet is transmitted by first device 502.

In a step 604, a transmitting device determines if the link is attempting to survive. To do so, the transmitting device may transmit an initiation data link layer packet having a new sequence numbering. If the receiving device transmits a positive acknowledgement in response to the initiation packet, then the transmitting device determines that the link is not attempting to survive; whereas, a negative acknowledgement (or no acknowledgement) indicates that the link is attempting to survive.

The operation of step 604 can be illustrated by way of the example transactions depicted in Table 1. After the link down event, first device 502 can transmit an initiation packet in accordance with step 604, wherein the initiation packet has a sequence number of zero. If second device 504 transmits an ACK in response to the initiation packet, then second device 504 is not attempting to survive the link down event in accordance with an embodiment of the present invention, but is instead attempting to recover from the link down event in a conventional manner (i.e., by clearing all sequence numbers and retransmitting all packets). If, however, second device 504 transmits a negative acknowledgement (or NAK) in response the initiation packet, then second device 504 is attempting to survive the link down event in accordance with an embodiment of the present invention.

If, in step 604, the transmitting device determines that the receiving device is not attempting to survive the link, then control passes to a step 606 in which the sequence numbering and flow control of the link are reset. From the example of Table 1, if first device 502 determines that second device 504 is not attempting to survive the link down event, then first device 502 resets its sequence numbering to zero.

Then in a step 608, the two-way serial-connection link is restarted in a conventional manner. As a result, all data link layer packets and transaction layer packets are reset, and a data link layer initiation packet (DL_INIT) is transmitted. Returning to the example of Table 1, in accordance with step 608 first device 502 transmits a data link layer initiation packet to restart the two-way serial-connection between first device 502 and second device 504. Consequently, in accordance with step 608 first device 502 retransmits the first through sixth packets—even though the first, second, and third packets were received and acknowledged by second device 504 before the link down event.

If, however, in step 604 the transmitting device determines that the receiving device is attempting to survive the link down event, control passes to a step 610 in which the sequence numbering and flow control of the link are maintained. From the example of Table 1, if first device 502 determines that second device 504 is attempting to survive the link down event, then in accordance with step 604 first device 502 maintains the sequence numbering at 2 (corresponding to the third packet) because this is the sequence number of the last packet that was received and acknowledged by second device 504.

Then, in step 612, any packets that were in-flight are replayed. Returning to the example of Table 1, the fourth, fifth, and sixth packets were in-flight because they were not acknowledged by second device 504. In accordance with step 612, therefore, first device 502 retransmits the fourth, fifth, and sixth packets.

Thus, unlike conventional methods for recovering from a link down event, method 600 enables a device to survive the link down event without losing previously transmitted packets (such as the first through sixth packets from Table 1), and without requiring an application and/or computing system to restart. After the link down event, the sequence numbering of the link may be maintained so that acknowledged packets (such as the first, second, and third packets) do not need to be retransmitted, and packets that were in-flight (such as the fourth, fifth, and sixth packets) are retransmitted.

IV. Example Software Implementations

In addition to hardware implementations of devices that are adapted to survive a link down event in accordance with an embodiment of the present invention (such as GPU 110, CPU 102, coprocessor 122, system memory 104, and the like), such devices may also be embodied in software disposed, for example, in a computer usable (e.g., readable) medium configured to store the software (e.g., a computer readable program code). The program code causes the enablement of embodiments of the present invention, including the following embodiments: (i) the functions of the systems and methods disclosed herein (such as systems and methods for recovering from and/or surviving a link down event); (ii) the fabrication of the systems and methods disclosed herein (such as the fabrication of devices that are enabled to recover from and/or survive a link down event); or (iii) a combination of the functions and fabrication of the systems and methods disclosed herein.

For example, this can be accomplished through the use of general programming languages (such as C or C++), hardware description languages (HDL) including Verilog, Verilog-A, HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

V. Conclusion

Set forth above are example systems and methods for recovering from and/or surviving a link down event that occurs in a two-way serial-connection link (e.g., PCI Express link). While various embodiments of the present invention have been described above, it should be understood that they have been presented by way of example only, and not limitation. It will be apparent to persons skilled in the relevant art that various changes in form and detail can be made therein without departing from the spirit and scope of the invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way. Thus, the breadth and scope of the present invention should not be limited by any of the above-described exemplary embodiments, but should be defined only in accordance with the following claims and their equivalents.

What is claimed is:

1. A method for surviving a link down event in a two-way serial-connection link, comprising:
   sequentially numbering packets to be transmitted from a first device to a second device across a link, wherein successfully transmitted packets are acknowledged by the second device;
   transmitting an initiation packet by the first device over the link after the link down event; and
   determining when the second device coupled to the link is attempting to survive the link down event based on response from the second device to the initiation packet, wherein a negative acknowledgement from the second device indicates the link is attempting to survive the link down event, and wherein a positive acknowledgement from the second device indicates the device is not attempting to survive the link down event.

2. The method of claim 1, further comprising:
   maintaining a flow control of the link before and after the link down event.

3. The method of claim 1, wherein the two-way serial-connection link comprises a peripheral component interface express (PCI Express) link.

4. A system for surviving a link down event, comprising:
   a first device coupled to a second device via a two-way serial-connection link;
   a first module configured to sequentially number packets to be transmitted from a first device to a second device across a link, wherein successfully transmitted packets are acknowledged by the second device;
   a second module configured to transmit an initiation packet by the first device over the link after the link down event; and
   a third module configured to determine when the second device coupled to the link is attempting to survive the link down event based on response from the second device to the initiation packet, wherein
   a negative acknowledgement from the second device indicates the link is attempting to survive the link down event, and wherein a positive acknowledgement from the second device indicates the device is not attempting to survive the link down event.

5. The system of claim 4, wherein when the link down event occurs the first device is also adapted to maintain a flow control of the link.

6. The system of claim 4, wherein the two-way serial-connection link comprises a peripheral component interface express (PCI Express) link.

7. The system of claim 4, wherein the first device is embodied in hardware description language software.

8. The system of claim 7, wherein the first device is embodied in one of Verilog hardware description language software, Verilog-A hardware description language software, and VHDL hardware description language software.

9. The method of claim 1, further comprising:
   retransmitting only packets that are unacknowledged by the second device when the second device coupled to the link survives the link down event, wherein each unacknowledged packet is retransmitted in accordance with its number within the sequence.

10. The system of claim 4, further comprising:
    a fourth module configured to retransmit only packets that are unacknowledged by the second device when the second device coupled to the link survives the link down event, wherein each unacknowledged packet is retransmitted in accordance with its number within the sequence.

* * * * *